INVENTORS
Martin Aidn
Hilmar Brunn 3,365,683
ARMATURE BEARING FOR ELECTROMAGNETIC RELAY
Martin Aidn and Hilmar Brunn, Munich, Germany, assignors to Siemens Aktiengesellschaft, a corporation of Germany
Filed Oct. 22, 1965, Ser. No. 501,858
Claims priority, application Germany, Dec. 22, 1964, S 94,760
7 Claims. (Cl. 335—274)

ABSTRACT OF THE DISCLOSURE

An armature bearing for an electromagnetic relay, having a plate-like armature having an angular configuration pivotally supported on an end edge of a yoke member, a leaf spring having one end engaged with the yoke member and the other end engaged with the armature, and an adjusting screw on the yoke member disposed to bear upon an intermediate portion of the spring spaced from the yoke member, the portion of the spring disposed between the screw and the armature-engaging end of the spring having a curved configuration with such end of the spring engaging the armature adjacent the engagement thereof with the yoke member at a point operative to apply a bearing pressure to the armature and simultaneously therewith a biasing pressure operative to provide a reset torque on the armature which may be varied by adjustment of such screw.

*The disclosure*

The invention relates to an armature bearing for electromagnetic relays, and more particularly, to an armature bearing for an electromagnetic relay having the armature positioned in a blade-like manner, with an approximately right angle design which is held by a talon-like spring, preferably a leaf spring.

In the past, a bearing spring was provided in electromagnetic relays which firmly presses the armature into its bearing, and which, upon movement of the armature, creates as little friction as possible. Furthermore, it is known to provide an additional spring acting upon the armature, which produces an armature reset torque. Such a reset spring may also be used in many cases when a certain rest-contact force, or a large resistance against impacts and vibrations of the relays, is required. Sometimes an adjustable armature reset spring also is needed when the relay is adjusted to prevent, as far as possible, the humming in AC operations.

Under certain conditions, both a bearing spring and an armature reset spring must act upon the armature, whereby the points of contact of these springs upon the armature must be taken into consideration in the design. Under automated production, it is often difficult to so install both springs that no mutual impediment will occur. In any case, however, it is possible to provide both springs with a corresponding fastener, and this arrangement does not provide a simple as possible construction of the relay.

An object of the present invention is to provide an armature bearing for an electromagnetic relay having a relatively simple design, and still having both a bearing spring and an armatuer reset spring.

According to the invention, a spring is provided that has a certain form and acts upon the armature with such a force that it is used both as a bearing spring and as an adjustable reset spring for the armature. The spring is a talon-like designed spring that expediently engages into a recess provided in the edge of the angularly-shaped armature. This recess in the armature causes the point of contact of the spring to be closely located to the pivoting point of the armature. Consequently, the friction at the bearing location of the spring is particularly small when the armature is moved.

A preferred embodiment of the invention provides that the spring end facing the armature and leading away from the yoke has a U-shape, and then extends on the edge of the armature in the direction of the angle bisector of the yoke edge. The position of the spring with reference to the point of application at the armature can thereby be varied by a screw penetrating through an aperture in the spring end facing away from the armature, whereby the spring end bears down at the adjustment screw. In one embodiment, this spring end merely bears against the yoke, an aperture may also be provided at the spring end, by means of which the spring can be held firmly in place by a peg. Moreover, the spring end facing away from the armature may be offset and engage an aperture in the yoke.

Instead of one recess in the armature, into which the spring engages, several recesses may be provided, whereby the spring then is provided with several correspondingly shaped ends. The screw for holding and adjusting the spring may be provided with a fine thread for the exact adjustment of the reset torque of the armature. The spring force applied at the head of the adjustment screw not only suppresses any play in the thread, but also produces a clamping torque causing a safety-guard of the ad-adjustment screw against unintended loosening.

Many other objects and advantages of the present invention will be obvious to those skilled in the art from the disclosure herein given.

Figure 1:
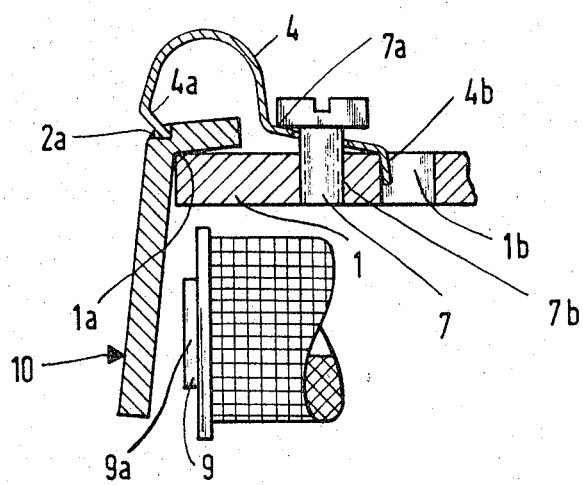
FIG. 1 shows the part of a relay which the armature bearing surrounds in schematic presentation and substantially in section.

FIG. 1 shows the construction or design of the armature bearing with no magnetic field present, providing a simple design which is particularly adjustable for automated production. The angle armature 2 is positioned on the yoke 1 at the yoke edge 1a. The leaf spring 4 engages with its end 4a into a recess 2a of the armature 2, said recess may be a milled or punched notch. The spring end facing armature 2 is designed in a U-shape as it leads away from yoke 1 and then extends on the edge of the armature 2 in the direction of the angle bisector of the yoke edge 1a. The position of the leaf spring 4 at the point of contact at the armature 2 is adjustable by a screw 7 penetrating the spring end 4b. Moreover, the spring 4 bears down at screw 7. This screw presses down the spring 4 with the outer edge of the screw head 7a. The armature 2 can move operatively between the stop 10, which is shown only schematically and the polar surface 9a of the core 9. The spring end 4b facing away from the armature 2 is offset here and engages into an aperture 1b of yoke 1.

Figure 2:
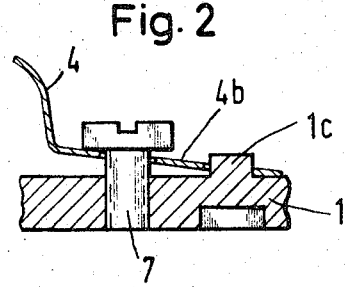
FIGS. 2 and 3 show possible fastening arrangements for the spring end facing away from the armature.
Figure 3:
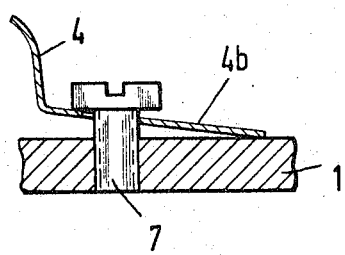

FIGS. 2 and 3 show variations of the fastening arrangements for the spring. According to the design in FIG. 2, the spring end 4b has an additional aperture through which a pin 1c of yoke 1 is inserted. In the embodiment according to FIG. 3, a special fastener for the spring end 4b is dispensed with, so that the spring end merely adheres to the yoke 1.

Figure 4:
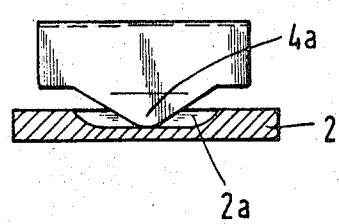
FIG. 4 shows the rounded spring end as it engages the armature.
Figure 5:
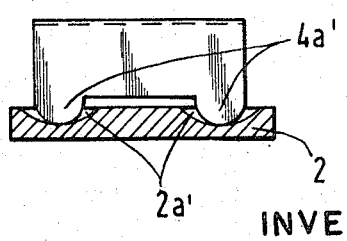
FIG. 5 shows a variation of FIG. 4 with two recesses in the armature and corresponding spring ends.

FIG. 4 shows how the rounded spring end 4a is applied into a milled or punched notch 2a of the armature 2. According to FIG. 5, the leaf spring 4 may also have two correspondingly-shaped spring ends 4a' coacting with two recesses 2a' of the armature 2. The recess in the armature makes it possible to obtain an almost optimal positioning of the contacting edge of the leaf spring 4. Due to this, the point of contact of the spring 4 is closely located to the yoke edge 1a as pivoting point, so that the friction at the bearing position of spring 4 caused by movement of the armature is very small.

When the adjustment screw 7 is turned into the yoke 1, it presses with the outer edge 7a of its screw head upon the spring 4, whereupon components of force are present in vertical and horizontal direction, whose resultant has the effect of a bearing force on the armature. Depending on the adjustment of the screw 7 and thus of spring 4, a reset torque results for the armature, which generally has a positive, but in special cases also a negative effect.

By appropriate dimensioning of the spring 4 and by appropriate selection of the contact of the force, it is possible that the bearing force applied to the armature remains practically constant in the selected range of setting of screw 7. The frictional relations between armature and spring are then substantially independent of the reset torque. If the course of the armature reset torque is determined as a function of the angle of rotation of the adjustment screw in a graph, so that the adjustment screw 7 becomes smaller when screwed inwardly, starting from the highest possible reset torque, a point will be reached where the bearing force passes precisely through the pivoting point of the armature (yoke edge 1a). In that case the reset torque applicable to the armature 2 has reached the value "zero," whereby the torque applied to armature 2 grows in a negative direction as the adjustment screw is turned further.

It is also important that the head of the adjustment screw 7 is eccentrically encumbered by the spring 4, so that a clamping torque is produced in addition to the elimination of the thread play. Consequently, the adjustment screw becomes sufficiently immovable. Due to the thread friction caused thereby and the additional frictional torque between spring 4 and outer head 7a of the adjustment screw 7, a special screw lock may be eliminated in many cases. The clamping torque and the frictional torque at the head of the adjustment screw thereby increase proportionately with the increase of the diameter of the screw head.

A particular advantage also arises as a result of the economical assembly, wherein the mounting of the bearing and the reset spring are combined without difficulty on the completely assembled relay. Moreover, where different conditions warrant it, it is possible at any time to replace the spring with one having a different spring constant. The spring may be designed both as a lead spring and as a coil-shaped spring.

Changes may be made within the scope and spirit of the appended claims which define what it is believed to be new and desired to have protected by Letters Patent.

We claim:

1. An armature bearing for an electromagnetic relay, comprising a plate-like armature having an angular configuration, a yoke member having an end edge on which said armature is pivotally supported, a leaf spring having one end engaged with said yoke member and the other end engaged with said armature, and an adjusting screw on said yoke member disposed to bear upon an intermediate portion of said spring spaced from said yoke member, the portion of said spring disposed between said screw and the armature-engaging end of said spring having a curved configuration with such end of the spring engaging said armature adjacent the engagement thereof with said yoke member at a point operative to apply a bearing pressure to said armature and simultaneously there with a biasing pressure operative to provide a reset torque on said armature which may be varied by adjustment of said screw.

2. An armature bearing according to claim 1, wherein said armature is provided with a recess in which the adjacent end of said spring is disposed.

3. An armature bearing according to claim 1, wherein the curved portion of said spring is substantially U-shaped with a free end of said spring engaging said armature to apply pressure thereto in the direction of the angle bisector of the yoke edge on which said armature is supported.

4. An armature bearing according to claim 1, wherein said spring is provided with an aperture through which said screw extends and by means of which the position of the spring with reference to the point of contact with the armature may be varied.

5. An armature bearing according to claim 4, wherein the end of said spring adjacent said yoke member is provided with an additional aperture, and a peg mounted on the yoke and arranged to enter said last mentioned aperture whereby the adjacent spring end is firmly anchored.

6. An armature bearing according to claim 4, wherein the yoke member is provided with an aperture, and the adjacent end of said spring is provided with a portion disposed in said last mentioned aperture.

7. An armature bearing according to claim 4, wherein said armature has a plurality of notches formed therein and the adjacent end of said spring is provided with a plurality of similarly shaped end portions each of which is disposed in a respective notch.

References Cited

UNITED STATES PATENTS 2,904,653    9/1959    Leo _____ 335—276

FOREIGN PATENTS 872,789    6/1961    Great Britain.
893,095    10/1953    Germany.
1,097,936    2/1955    France.

BERNARD A. GILHEANY, *Primary Examiner.*

GEORGE HARRIS, JR., *Examiner.*